Patented Dec. 16, 1952

2,622,027

UNITED STATES PATENT OFFICE 2,622,027

METHOD OF TREATING ANIMAL BONES

David Torr, New York, N. Y., assignor to Charles J. Ely, Oakland, N. J.

No Drawing. Application May 3, 1950,
Serial No. 159,857

5 Claims. (Cl. 99—107)

This invention relates to the treatment of animal bones and the production of improved food products therefrom; and includes an improved method of treating animal bones, the improved product so produced, and compositions and packaged products containing the same.

Animal bones are one of the by-products of meat packing houses. The bones, after the separation of the meat therefrom, are commonly subjected to treatment for the extraction of oils and fats and also for the recovery of gelatin therefrom, usually by prolonged treatment of calcium hydroxide and water, cooking at high temperatures, etc. The resulting bones after drying are commonly ground up into bone meal for use as a fertilizer or for use in animal and chicken feed. Such bone meal is used only to a limited extent for human food.

The improved process of the present invention utilizes the animal bones without extraction of fats and gelatin, and converts the entire bone, including both the organic and inorganic bone constituents, into a nutritionally valuable colloidal product, with the fine inorganic particles of colloidal size dispersed in a continuous colloidal plastic matrix of the organic constituents, including gelatin and gelatin-yielding materials.

While animal bones are made up to a large extent of inorganic bone phosphate they also contain a large amount of organic matter. The bone structure moreover is of a complex character being in part spongy and in part laminar, with bone layers deposited largely in concentric laminae which may be of only a few microns in thickness. The bone is made up in part of cellular and in part of intercellular substances. The inorganic components of bone are largely phosphates, commonly considered to be calcium phosphate but of a more or less complex composition. The organic material present includes connective and intercellular tissues or cartilage, blood vessels and nerves, and bone marrow. The organic matter makes up a large proportion of the total solid materials of the bones, e. g., up to around 60% (dry basis), and if the inorganic components are dissolved out by mineral acids the organic material remains as an elastic mass with much the original shape of the bone. Even where bones are treated to extract the fats therefrom and to recover as much gelatin as possible therefrom there remains organic material which is not extracted. And the organic constituents of bones are largely considered to be indigestible or unavailable in character.

In the improved process of the present invention the entire bone material, including the inorganic components and the organic components, is first subjected to crushing and to grinding and is then subjected to further and repeated disintegration with progressive reduction in size of the bone particles and hydrolysis of organic material until the entire mass is in a colloidal state containing both the organic and inorganic components of the bones. As a result, the inorganic portions of the bones are in such a fine state of subdivision that, even though present to a large extent in the colloidal product, they are so blended with the organic material that they do not have the characteristic ground bone or chalky feel or taste. In this form the inorganic matter is readily available as a food product and as a source of calcium and phosphorus. The organic components of the bone are also so disintegrated and hydrolyzed and blended in the colloidal product that they are largely available and valuable as edible constituents, as hereinafter described.

The animal bones which are utilized and treated according to the present invention are bones of the edible animals commonly slaughtered at slaughter houses such as beef, lamb and pork. These bones vary somewhat in their composition and in the proportions of inorganic and organic material. They may have adhering fat, meat and sinews attached thereto as well as meat which is not readily removed therefrom.

The bones are advantageously used in a fresh uncooked state and converted into the new composite colloidal product which may be cooked or sterilized during the disintegrating hydrolyzing operation or subsequent thereto.

The raw uncooked bones may be bones from which all of the meat that is readily removed therefrom has been removed. In some cases the bones are also advantageously freed from marrow to give a ground product of lower fat content and which is made up of the organic and inorganic constituents of the bones other than marrow. For other purposes the marrow is advantageously left in the bones and disintegrated therewith and forms an intimate and substantial portion of the organic matrix of the final colloidal product.

Some bones have more or less meat adhering thereto and such bones can also advantageously be used in the present process to give a composite colloidal product which contains the added meat, intimately admixed with the organic and inorganic components of the bones themselves, in a final colloidal product.

Instead of using raw fresh uncooked bones, or bones with adhering uncooked meat, the bones may be first cooked, either alone or with adhering and admixed meat, and then subjected to the disintegrating and hydrolyzing operation to produce a colloidal product therefrom. When the bones are advantageously so cooked they are cooked at a relatively low temperature, much lower than that commonly used for cooking the bones for the extraction of the gelatin therefrom.

In treating the bones they are first broken up and crushed, e. g., by a hammer mill or bone crusher to relatively small pieces of, e. g., 1/16" size, and are then further ground or crushed, e. g., in a hammer mill to around 100 mesh size. The material is then subjected to further reduction in a differential roll mill, and advantageously completed by disintegration and hydrolysis in a colloid mill in successive stages, e. g., in three or more successive stages, with progressively closer setting of the colloid mill until finally the product is reduced to a fineness such that the inorganic bone particles are in general below 10 microns and advantageously below 5 microns, and with a range of e. g. 1 to 10 microns or less. A colloid mill with a shaft and with rotor and stator adjustable as to clearance is advantageously used with a speed of rotation of around 6,000 to 15,000 R. P. M., and with surfaces of the rotor and stator of a material such as carborundum, synthetic sapphire, or diamond, which will exert the necessary grinding and shearing of the bone particles to reduce them to the ultimate state of fineness above indicated.

In disintegrating and hydrolyzing in such a colloid mill, where the final setting is almost zero clearance, a considerable amount of heat is generated and cooling may be necessary to avoid overheating of the material during grinding. By sufficient cooling of the mill the final product, if made from uncooked bones, can be recovered in an uncooked state. By proper regulation of the temperature during disintegration and hydrolysis the product may be sterilized or cooked to a greater or less extent by the heat generated in the disintegrating and shearing operations in the closely set colloid mill. The operation is advantageously carried out in an inert atmosphere, such as nitrogen or carbon dioxide, or with protection of the material from the air to avoid oxidation. Depending on the final product desired, the temperature in the colloid mill may range to near the boiling point.

The heating of the material during disintegration and hydrolysis may tend to remove more or less water therefrom and dry out the product. To avoid this, or to give a product of increased moisture content, water can be admixed with the product before or during the final disintegration and hydrolysis to increase the moisture content of the product, and to give a final product of a gelatinous nature and of regulated and predetermined moisture content. Where the moisture content is around 15 to 30% the feed to the mill is advantageously a forced feed. With a higher moisture content of the material, e. g., between 50 and 60%, or up to 100%, or even up to 200% or 300% or 500%, or higher, a gravity feed may be sufficient.

The successive disintegrating and hydrolyzing operations result not only in progressive comminution of the inorganic bone material into finer and finer particle sizes but also result in a most intimate and homogeneous intermixture of the organic constituents with a breaking up of connective tissue, cartilage, blood vessels, marrow, and other organic matter and hydrolysis of protein and other constituents into an ultimate state of subdivision and hydrolysis which makes the organic material colloidal in character. The protein and nucleoprotein and the bone cartilage are not only thoroughly broken up and disintegrated into a colloidal state but are hydrolyzed and intimately and thoroughly blended with each other in the colloidal matrix in which the colloidal inorganic bone particles are held in uniform suspension.

The disintegrating and shearing action which reduces the inorganic bone material to a colloidal state of subdivision also acts upon the bone tissue and other organic material to subject them also to the shearing and disintegrating and hydrolyzing operation. And the bone tissue material which is not commonly considered digestible is converted into such a finely divided state that it becomes digestible. By avoiding high temperature cooking, the protein material of bone is broken up and hydrolyzed by the present process into a form which makes available valuable constituents thereof, hereinafter described.

The disintegration, comminuting and hydrolysis of the product is carried to the point where the product is no longer gritty and no longer has the characteristic ground bone or bone meal taste or feel. In general a disintegration to a particle size of around 1 to 10 microns or less is sufficient for this purpose. With the bone particles so finely disintegrated the product is a palatable product, with the fat, proteins and hydrolyzed proteins and other inorganic and organic bone constituents so intimately blended that they have largely lost their identity in the colloidal gelatinous product.

Where the bones treated are freed from adhering meat and also freed more or less completely from bone marrow, the finely disintegrated product will contain the entire bone constituents, other than the marrow, with both the inorganic material and the organic material, including osseous tissues reduced to a hydrolyzed colloidal gelatinous state.

With uncooked bones, and bones which are not heated to too high a temperature during disintegration, the bone tissues rich in lycine and other amino acids and which are commonly considered unavailable are converted into a state where their lycine and other amino acid content is largely available, thus giving a valuable food product relatively rich in lycine and other amino acids for purposes where a deficiency of amino acids is indicated.

Where the bones are free from meat but contain the bone marrow, the bone marrow, which is largely fatty in character and which has other valuable food elements, is also incorporated in the final colloidal product.

Where the bones have more or less attached meat and this is also disintegrated and hydrolyzed with the bones, the resulting colloidal product will have an increased protein content resulting from the admixed meat. Cartilage material when present adhering to the bones or admixed therewith will similarly be disintegrated and hydrolyzed to a fine state which will destroy the cartilage physical structure and give the constituents thereof in a state of fine hydrated colloidal gelatinous dispersion intimately admixed with the other constituents of the bones.

Where the bones are cooked before disintegrating the cooking in general should be at a low temperature, e. g., for one hour at 180° F., and below the temperatures used for cooking of the bones for the extraction of gelatin therefrom.

The product of the disintegrating and hydrolyzing operation is a colloidal product somewhat comparable with butter or jelly in feel and consistency, but it may contain a greater or less amount of water and may vary in consistency from a thin jelly, where water is added, to a thick butter-like or stiff jelly product, where the water content is low or the product is partially dried during disintegration and hydrolysis.

By further drying, advantageously in a vacuum or at a low temperature, a dry solid product is obtained which can be ground up into powder form. In general, however, the colloidal product in more or less thick jelly or gelatinous form can advantageously be used as a food product or for blending with other food products, for human consumption, or as an adjunct for animal or poultry feeding.

The new colloidal bone products have a distinctive composition and contain a combination of highly valuable nutritional ingredients. Thus, the new colloidal products contain all of the inorganic constituents of the bone in a fine state of subdivision which makes them readily available to supply the nutritional requirements of these elements. The inorganic constituents may thus comprise around 40% of the dry product. Of the inorganic constituents the phosphate content, calculated as calcium phosphate, may be around 85% of the inorganic components together with a small percentage, e. g. around 1½% of magnesium phosphate. Calcium carbonate, in a free or combined state, may be present to the extent of around 10% and alkali salts to the extent of around 2% together with small amounts of fluorides and chlorides. The disintegration of the inorganic structure of the bone largely or completely frees the individual inorganic particles from adhering organic matter; and these fine inorganic particles are readily available sources for supplying dietary deficiencies, particularly of calcium and phosphorus, in which, as is well known, human food is often deficient.

The disintegration and hydrolysis not only breaks up the physical structure of the organic matter and converts it into a uniform, homogeneous, colloidal, gelatinous mass carrying the finely divided inorganic material in dispersion therein, but the disintegration and hydrolysis breaks down or hydrolyzes to a greater or less extent protein and other material such as ossein or collagen into gelatin, and makes available the valuable gelatin content or component of the organic matter of the bones in a valuable nutritional form. Thus the approximate amino acid composition of gelatin protein is as follows:

| | Per cent |
|---|---|
| Alanine | 11.2 |
| Arginine | 8.5 |
| Aspartic acid | 9.6 |
| Cystine | 0.1 |
| Glutamic acid | 6.1 |
| Glycine | 26.5 |
| Histidine | 1.1 |
| Hydroxyproline | 14.6 |
| Isoleucine | 1.9 |
| Leucine | 4.1 |
| Lysine | 4.8 |
| Methionine | 0.9 |
| Phenylalanine | 2.2 |
| Proline | 17.2 |
| Serine | 3.7 |
| Threonine | 1.7 |
| Tryptophan | 0.0 |
| Valine | 2.8 |

In contrast with bone meal from gelatin extracted bones, the new colloidal product of the present invention contains as a major or important constituent the gelatin resulting from the partial or complete hydrolysis of the ossein or collagen of the bone in a readily available form, thus making the new colloidal product a valuable food adjunct because of its content of such hydrolyzed products. The bone proteins other than collagen or ossein forming part of the bone matrix are similarly disintegrated and hydrolyzed and converted into a readily available form of protein. The fat content of the bone matrix and of the bone marrow and any adhering or admixed fat is also disintegrated into an exceedingly fine and available form. Other and minor organic components of the bone are also present in a fine state of dispersion in the colloidal gelatinous product.

In physical consistency the new colloidal product may be, as above indicated, produced in a dry state and in powder form. It is advantageously produced in the form of a colloidal jelly-like mass or gelatinous mass which may vary in consistency from a thin jelly, particularly where a considerable amount of water is added prior to or during the final disintegration and hydrolysis. Even with a considerable amount of water present the colloidal product is nevertheless a jelly-like or gelatinous product, apparently due in part to the gelatin set free by hydrolysis during the process. The intimate colloidal intermixture of all of the organic matter may also be responsible for the gelatinous or jelly-like character of the product, which, in a highly concentrated state, with a small amount of water, resembles a thick jelly or a more or less stiff gelatinous mass with considerable body.

The new colloidal product is a valuable supplement for use with other foods. It is a palatable product and can be admixed with salt, or may have salt added to it, and utilized directly as a food product or adjunct. Its high content of calcium and phosphorus, however, makes it particularly valuable as a supplement for use with other foods which are deficient in calcium and phosphorus; and it not only supplies such deficiency but also supplies other valuable organic food ingredients.

The new colloidal product can advantageously be admixed with other foods to form a composite food product. It is thus a valuable concentrated product for use in making soups or soup stock and for admixture with other ingredients for soup manufacture.

The new colloidal product is a particularly valuable product for use with other meat products. It can thus be advantageously added to and admixed with the other materials commonly used in making frankfurters, bologna or deviled or potted meats or meat spreads, luncheon meats, etc., in amounts which will supply the dietary requirements, e. g., of calcium or phosphorus, or both. It may thus be admixed in such products to the extent of 5 to 35% or more. The colloidal and gelatinous or jelly-like character of the product is of value in giving a firmer consistency to many of the meat products with which it is admixed.

The new colloidal product is also advantageously admixed with meat such as is used for meat loaf or canned ground meat products such as canned hamburgers, canned stews, etc. in amounts, e. g., of 10 to 35%.

Another advantageous application of the invention is in canned meat, where meat is cut up into pieces and placed in cans. The colloidal bone product of the present invention is advantageously used with such meat pieces to fill the interstices, or to form a matrix containing pieces of meat distributed therein, giving a can of meat filled with meat pieces or chunks surrounded by the colloidal matrix. Meat which is deficient in bone constituents can thus be supplemented with the colloidal product to give a more balanced food product, using up to e. g. 25% or 33⅓% of the new colloidal product with the balance of the canned meat product made up of pieces of meat of suitable size packed in the same can. The uncooked meat, admixed with the uncooked colloidal material, can be placed in the can and sterilized or cooked in the can; or both the meat and the colloidal material can be precooked separately or in admixture before canning.

In utilizing the new colloidal product for food purposes vitamin D is advantageously added to promote the assimilation or metabolism of calcium and phosphorus.

The new colloidal bone product is also advantageously utilized as an ingredient of infant foods such as "Pablum," strained meat products for infants, etc., since it supplies the calcium and phosphorus as well as the other food constituents of the bone in a particularly advantageous form. It may be added, e. g., to the extent of 2 to 10% of the product.

The new colloidal product is a valuable product not only as an adjunct or food product for human food but is also advantageous for use in animal foods or poultry foods, e. g., to the extent of 10 to 35%, making both the inorganic and the organic constituents of the bone readily available to supply dietary deficiencies in these constituents. The colloidal product can thus be admixed with other connstituents of chicken feed or of animal feed or can be separately supplied as a supplemental food product. In canned animal food, e. g., canned dog meat or canned food providing a balanced ration, the colloidal bone product of the present invention can advantageously be added to supply the calcium and phosphorus requirements and to contribute other valuable food constituents.

The importance of calcium and phosphorus and the fact that human and animal diet is almost universally deficient in calcium and phosphorus is well recognized. Thus, Professor Henry C. Sherman, Professor Emeritus of Chemistry at Columbia University, in his book "Calcium and Phosphorus in Foods and Nutrition," published in 1947, states in the preface:

"Mineral elements rank with vitamins in their importance to human and animal nutrition, and among the mineral elements calcium and phosphorus are outstanding."

And he states further at page 6 that "the calcium content of flesh as we eat it is so small as to be negligible from the dietary viewpoint"; and he elaborates on page 10 on the calcium deficiency from a nutritional standpoint both in this country and abroad.

The improved colloidal product of the present invention is particularly advantageous in supplying both the calcium deficiency and phosphorus deficiency, and also makes other valuable components of the bones, including organic and hydrolyzed organic components, available in a readily assimilable form. Particularly where the diet is largely a meat diet, deficient in calcium and phosphorus, the addition of the new colloidal bone material overcomes this deficiency. Thus the inorganic or mineral components of the bone, as well as the organic components, when disintegrated to a particle size of the inorganic components of around 1 to 10 microns or an average particle size of, for example, around 2 microns, and with the organic components disintegrated and hydrolyzed into a homogeneous colloidal gelatinous matrix, containing the inorganic particles dispersed therein, form a readily available and readily digestible composite food product valuable for supplying nutritional requirements and as an adjunct for use with other food materials.

Where an increase in fat content is desired in the product, pieces of fat can be added to the bone and disintegrated therewith to give a colloidal product which contains the added fat material dispersed in the colloidal product. Fat pieces which themselves are unpalatable are thus blended in the colloidal product in a palatable form and any deficiency in fat content of the colloidal product or in the composite products with which it is to be used, for example, with lean meat, can thus be supplied in an advantageous manner.

Extracted bone meal, rich in inorganic bone constituents, but low in organic bone constituents, can also advantageously be admixed with meat, or fat, or both meat and fat, and subjected to the progressive disintegration hereinbefore described to give a colloidal product containing the colloidal inorganic bone constituents in a matrix of colloidal hydrated meat constituents, or admixed meat and fat, with the finely divided inorganic particles of colloidal size dispersed in a meat, or meat and fat, colloidal menstruum. The proportions of bone material and of meat, or meat and fat, can be varied, for example, using equal parts of bone and meat to give a product with approximately equal proportions of inorganic colloidal bone particles and colloidal meat matrix; or a larger proportion of meat can be used, for example, two or three parts of meat to one of bone, to give a colloidal product of correspondingly increased colloidal meat protein content in a hydrolyzed state. The amount of fat which can be added can also be varied, for example, from a few percent to a quarter or a half of the protein content.

Such a product, made from extracted bone, differs materially in its composition from the products made from whole bone; and provides a different and alternative product differing materially in its composition.

I claim:

1. The method of treating animal bones containing the normal inorganic and organic constituents thereof which comprises crushing and disintegrating the bones and continuing the progressive disintegration of the bone material until the entire product is converted into a colloidal gelatinous mass, the temperature of the material during disintegration being raised to that sufficient to effect hydrolysis of the protein of organic constituents of the bone material, the inorganic constituents of the bone material being disintegrated to an extent such that the major portion of them have a particle size of less than about 10 microns, the disintegration uniformly dispersing said inorganic constituents in a colloidal organic matrix containing the disintegrated and hydrolyzed organic components of the bones.

2. The process according to claim 1 in which the bones are substantially free from adhering meat but contain their normal marrow content.

3. The process according to claim 1 in which the bones are relatively free from meat and from bone marrow.

4. The process according to claim 1 in which the entire bones are subjected to a disintegrating and hydrolyzing operation together with admixed animal meat.

5. The process according to claim 1 in which the bones subjected to disintegration have associated therewith, tendons, sinews, connective tissues, fats, muscle meats and gristle.

DAVID TORR.

REFERENCES CITED

The following references are of record in the file of this patent:

UNITED STATES PATENTS

| Number | Name | Date |
| --- | --- | --- |
| 54,635 | Wister | May 8, 1866 |
| 259,140 | Harris | June 6, 1882 |
| 388,339 | Brinck et al. | Aug. 21, 1888 |
| 764,268 | Boileau | July 5, 1904 |
| 1,057,215 | Bohrmann | Mar. 25, 1913 |
| 1,254,317 | Faust | Jan. 22, 1918 |
| 1,254,734 | Schou | Jan. 29, 1918 |
| 1,697,857 | Dyer | Jan. 8, 1929 |
| 1,814,587 | Daniels | July 14, 1931 |
| 2,126,445 | Boutilier | Aug. 9, 1938 |

OTHER REFERENCES

"Chemical and Metallurgical Engineering," May 1938, No. 5, pages 241 and 242.

"Provender Milling," 1945, by Lockwood, published by Northern Publishing Co. Ltd., New York, page 36.

"Chemical Engineers' Handbook," by John H. Perry, third edition, 1950, published by McGraw-Hill Book Company, page 1145, table 43 on page 1154, and emulsification article on pages 1167 to 1169.